United States Patent
Koenraadt et al.

(10) Patent No.: US 6,812,269 B2
(45) Date of Patent: Nov. 2, 2004

(54) PROCESS FOR PREPARING AN AQUEOUS POWDER COATING DISPERSION

(75) Inventors: Martinus Adrianus Antonius Maria Koenraadt, Duiven (NL); Gerard Henk Beijers, Doetinchem (NL); Johan Eric Borgström, Oxie (SE); Kent Raabjerg Sörensen, Perstorp (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/203,604

(22) PCT Filed: Feb. 8, 2001

(86) PCT No.: PCT/EP01/01386

§ 371 (c)(1),
(2), (4) Date: Nov. 13, 2002

(87) PCT Pub. No.: WO01/59016

PCT Pub. Date: Aug. 16, 2001

(65) Prior Publication Data

US 2003/0092799 A1 May 15, 2003

(30) Foreign Application Priority Data

Feb. 11, 2000 (EP) .......................................... 00200449

(51) Int. Cl.[7] .................................................. C08J 3/00
(52) U.S. Cl. ........................................ 523/336; 516/99
(58) Field of Search ............................. 523/336; 516/99

(56) References Cited

U.S. PATENT DOCUMENTS

| | | | |
|---|---|---|---|
| 4,013,615 A | 3/1977 | Ohashi et al. | 260/42.53 |
| 4,886,845 A | 12/1989 | Becker et al. | 523/403 |
| 5,379,947 A | 1/1995 | Williams et al. | 241/21 |
| 6,159,556 A | 12/2000 | Möller et al. | 427/475 |
| 6,204,310 B1 * | 3/2001 | Choudhery | 523/348 |
| 6,284,321 B1 | 9/2001 | Brindoepke et al. | 427/385.5 |
| 6,291,579 B1 | 9/2001 | Kalck et al. | 524/832 |
| 6,296,903 B1 | 10/2001 | Sapper et al. | 427/195 |
| 6,512,024 B1 * | 1/2003 | Lundgard et al. | 523/335 |

FOREIGN PATENT DOCUMENTS

| | | | | |
|---|---|---|---|---|
| DE | 196 52 813 A1 | 6/1998 | | C09D/5/46 |
| DE | 197 27 892 A1 | 1/1999 | | C09D/5/46 |
| EP | 636 669 B1 | 2/1995 | | C09D/167/06 |
| EP | 702 040 B1 | 3/1996 | | C08G/18/67 |
| WO | WO 96/37561 A2 | 11/1996 | | C09D/5/00 |
| WO | WO 96/37561 A3 | 11/1996 | | C09D/5/00 |
| WO | WO-9745476 | * 12/1997 | | |
| WO | WO 97/45476 A1 | 12/1997 | | C08J/3/20 |

OTHER PUBLICATIONS

International Search Report of International Application No. PCT/EP 01/01386, dated Jun. 22, 2001.
Brinks, B. P., "Modern Aspects of Emulsion Science," The Royal Society of Chemistry, Chapter 6, pp. 175–204, 1998.

* cited by examiner

Primary Examiner—Cephia D. Toomer
(74) Attorney, Agent, or Firm—Lainie E. Parker; Richard P. Fennelly; Joan M. McGillycuddy

(57) ABSTRACT

A process for preparing an aqueous powder coating dispersion comprising components A and B, wherein component A is a binder resin or a mixture of binder resins and component B is a crosslinker or a mixture of crosslinkers or component A is a crosslinker or a mixture of crosslinkers and component B is a binder resin or a mixture of binder resins, wherein the process comprises the steps of: a) dispersing a composition comprising component A by the addition of an aqueous medium in a phase inversion emulsification process, b) adding component B simultaneously with or after the addition of the aqueous medium, and c) optionally mixing the obtained composition to obtain a dispersion comprising components A and B. The process enables the preparation of stable powder coating slurries with particles in the range from 50 to 800 nm.

17 Claims, No Drawings

PROCESS FOR PREPARING AN AQUEOUS POWDER COATING DISPERSION

This application is the national phase of PCT/EP01/013863 filed Feb. 8, 2001, which claims the benefit of European Patent Application No. 00200449.7, filed Feb. 11, 2000.

The invention pertains to a process for preparing an aqueous powder coating dispersion comprising components A and B, wherein component A is a binder resin or a mixture of binder resins and component B is a crosslinker or a mixture of crosslinkers or component A is a crosslinker or a mixture of crosslinkers and component B is a binder resin or a mixture of binder resins. Optionally the aqueous powder coating dispersion contains a pigment, a thickener, a filler, a catalyst, an initiator, and/or one or more additives.

Solid powder coating compositions comprising a suitable resin/crosslinker combination are commonly used for coating a substrate with a crosslinked film, by evenly distributing the composition over the surface of the substrate by spraying and curing the resulting layer on the substrate. Curing on a metallic substrate, for example in industry in general, most commonly takes the form of applying an elevated temperature, for example from 160 to 200° C. However, curing can also take the form of applying radiation/light, for example ultraviolet light or electron beam radiation, a process which is especially suitable for coating substrates that cannot withstand high temperatures (plastics, wood, etc.).

When a solid powder coating composition is used to coat a substrate, special application equipment is required. Furthermore, it is difficult to obtain a thin crosslinked film with a uniform thickness and appearance on the substrate, due to the relatively large size and irregular shape of the particles in the powder coating composition. Reducing the particle size in such a composition, e.g. by jet milling, is not only costly but often leads to caking and other handling/application problems of the resulting fine powder. For example, it is difficult to charge the very small particles during electrostatic application, and elaborate steps need to be taken to cope with dust when such a composition is applied on a substrate. Further, once a solid powder coating composition is prepared, due to its solid character there is no flexibility to adapt properties like for example colour, gloss etc.

Hence there are considerable advantages to applying a particulate powder coating as a dispersion for coating a substrate. No dust is formed when the dispersion is spread on the surface of the substrate, and it was found that the particles in the dispersion can be much smaller than in a solid powder coating composition without creating handling/application problems.

As indicated above, powder coating dispersions have a number of advantages over particulate powder coating compositions. Further, these dispersions have an advantage over solvent-borne coating compositions since there is no need for the evaporation of any organic solvent. The emission of most organic solvents contributes to the VOC level of the coating composition. The VOC level is restricted by present day legislation. Such restrictions are expected to be tightened in the near future.

Also, in the case of a liquid dispersion it is possible to use equipment commonly used for handling/applying conventional wet paints, while special equipment is needed for handling/applying solid powder coating compositions. Application on non-conductive substrates like wood and plastics is also easier.

In general, the $T_g$ of the components which can be used for preparing the aqueous powder coating dispersion can be much lower than in solid powder coatings, because there is no need for high $T_g$ binders that are used in a standard (solid) powder coating to ensure sufficient physical stability.

The possibility to incorporate binders with much lower $T_g$'s increases the freedom of binder formulation. This additional degree of freedom in binder formulation has a positive effect on final film properties like flow, appearance etc.

Furthermore, paint additive(s) can be added to a final dispersion without any problems, making the preparation of a paint formulation from a dispersion much more flexible. It is also relatively easy to filter a dispersion in order to remove impurities/large particles.

For example, WO 96/37561 discloses a wet milling process for the production of an aqueous powder coating dispersion, in which process a solid powder coating composition is wet milled in an aqueous medium. However, the powder coating dispersion obtained has a comparatively wide particle size distribution (3–20 μm), and the particles are still irregularly shaped and relatively large.

Preparation of smaller particles than described by traditional wet-milling processes is in general very difficult and economically not attractive. Larger particles in powder coating dispersions have a strong tendency to sediment which is undesirable because this limits the stability of the final dispersion. The sediments formed are normally hard to re-disperse and in practice additional measures have to be taken to prevent sedimentation for example by adjusting the rheology of the coating formulation by adding thickeners or other rheology modifiers. A disadvantage of adding thickeners in general is that the solids content of the final coating formulation decreases which is not desirable. Also the film formation is negatively influenced by the presence of bigger particles which is observed by phenomena like mud-cracking, poor flow, no uniform layer thickness etc. Furthermore, the process cannot be carried out continuously, and obtaining particles with the above-mentioned size requires a comparatively long milling time (about 2 hours).

Similar sized/shaped particles are obtained in U.S. Pat. No. 5,379,947, where a jet milling process for the production of an aqueous powder coating dispersion is disclosed. Powder coating flakes are jet milled, and the resulting powder is dispersed in an aqueous medium to obtain a dispersion. Such a process cannot be carried out continuously either, and jet milling until particles of the desired size are formed also requires a comparatively long period of time. Other disadvantages of such a jet milling process are the requirement to use expensive equipment and a relatively high energy consumption.

WO 97/45476 discloses a process for the preparation of a powder coating dispersion wherein a molten-like substance comprising a resin and a crosslinker is dispersed in a liquid medium under extrusion conditions. In this process the starting materials such as binder resin(s) and crosslinker (s) are mixed and molten. Then water is added to the molten mixture and a powder coating dispersion is obtained. Since the obtained powder coating dispersions are cured by heat, this process is not suited for the preparation of powder coating dispersions comprising a binder/crosslinker mixture that start to react at a temperature close to or below the melting or softening temperature of the mixture.

It is the objective of the present invention to provide a process for preparing an aqueous powder coating dispersion without having the above-mentioned disadvantages.

A process was found for preparing an aqueous powder coating dispersion comprising components A and B, wherein component A is a binder resin or a mixture of binder resins and component B is a crosslinker or a mixture of crosslinkers or component A is a crosslinker or a mixture of crosslinkers and component B is a binder resin or a mixture of binder resins.

This process is characterised in that the process comprises the steps of:
 a) dispersing a composition comprising component A by addition of an aqueous medium in a phase inversion emulsification process,
 b) adding component B simultaneously with or after the addition of the aqueous medium, and
 c) optionally mixing the obtained composition to obtain a dispersion comprising components A and B Since components A and B are dispersed separately or mixed at relative low process temperatures, this process is particularly suited for preparation of aqueous powder coatings dispersions based on a wide range of binder/crosslinker combinations, including combinations that start to react at temperatures below or close to the processing temperature.

For the purpose of the present invention, a dispersion comprising a binder/crosslinker mixture wherein the binder and/or the crosslinker have a $T_g$, softening point or a melting temperature above 30° C. is considered as a powder coating dispersion.

Component A is dispersed in a phase inversion emulsification process. Such emulsification process is also known as an indirect emulsification process. The formation of the dispersion comprising component A can be described as a process whereby starting with a component A as a continuous phase under certain conditions by the addition of water the continuous phase inverts into a phase where the aqueous medium becomes the continuous phase resulting in an aqueous dispersion.

More and detailed information on phase inversion emulsification processes can, for example, be found in Chapter 6 of Bernard P. Binks, *Modern Aspects of Emulsion Science*, The Royal Society of Chemistry 1998.

To facilitate the dispersion of the composition comprising component A, this composition can be heated before the aqueous medium is added. In a preferred embodiment, the composition comprising component A is heated to a temperature above the melting point or the glass transition temperature ($T_g$) of component A to obtain a molten-like substance. Before the aqueous medium is added, the molten-like substance can be cooled down to such an extent that when said substance is dispersed in the aqueous medium, the temperature in the forming dispersion does not exceed the boiling point of the aqueous medium, in order to prevent as fully as possible the evaporation of water and/or build-up of pressure in the process equipment.

Alternatively and/or in addition to the heating of component A, the aqueous medium can also be heated before it is added to component A.

Furthermore, it is preferred in the process according to the invention that the dispersing is carried out at atmospheric pressure, in order to facilitate process control without the need to use equipment that can withstand high pressures.

A suitable amount of an aqueous medium for obtaining a homogeneous dispersion can be applied in the process. Furthermore, it is possible to dose an additional amount of aqueous medium during or after dispersing, in order to obtain an aqueous powder coating dispersion with the desired temperature, viscosity, and/or content of solids.

In one embodiment of the process according to the present invention component B is added simultaneously with the aqueous medium. This can be done by solving component B in the aqueous medium, but it is also possible, if component B is not water soluble, to make an aqueous dispersion comprising component B. This aqueous dispersion comprising component B can be obtained by the addition of an aqueous medium to component B, or to a composition comprising component B. To facilitate the dispersion, the aqueous medium may comprise dispersing agents.

The aqueous dispersion comprising component B can also be prepared in a phase inversion emulsification process.

In another embodiment, a dispersion comprising component A is prepared in a first step in a phase inversion emulsification process. In a next step, to this dispersion component B is added dispersed or not. The thus obtained compositions should then be mixed and/or kneaded in such a way to obtain a homogeneous dispersion comprising components A and B. The dispersion comprising component B that is optionally used in this embodiment B can also be prepared in a phase inversion emulsification process.

Both embodiments are suited for the preparation of a powder coating dispersion comprising a binder/crosslinker mixture that start to react at a temperature close to or below the melting and/or softening temperature of this mixture, since this process avoids the necessity of heating the mixture to this temperature during the preparation of the powder coating dispersion.

The latter embodiment is in particular suited for the preparation of a powder coating dispersion that contains a binder/crosslinker mixture that is reactive at ambient temperature. For such mixture, the binder is solved/dispersed in one process, the crosslinker is dispersed/solved in a separate step and the two thus obtained compositions are mixed just before application.

The steps in the process according to the invention to produce a homogeneous dispersion are preferably carried out in an extruder, more preferably a twin-screw extruder (for example a Berstorff twin-screw extruder, type ZE 25, 43 L/D, or a Leistritz twin-screw extruder, type micro-18 GL 40D), in order to control the temperature in an accurate way, to disperse the substance in an aqueous medium under ideal mixing conditions, and optionally to mix the different components together, thereby enabling the formation of an aqueous powder coating dispersion comprising small, spherical-like particles with a narrow particle size distribution. When an extruder is used as the apparatus to prepare the aqueous powder coating dispersion in accordance with the present invention, the process can be also referred to as 'phase inversion extrusion', abbreviated as 'PIE process'.

If component B is added solved or dispersed in the aqueous medium, this solution or dispersion is normally prepared in a separate step. This can be done, for example, in another extruder that is optionally coupled to the extruder wherein the dispersion of component A is prepared. Mixing of the compositions containing A and B can be done either at low or high shear conditions, in- or outside the equipment used to prepare a dispersion comprising component A.

The desired average particle size can be obtained by choosing the right conditions (mixing speed, number of mixing and/or transporting elements in the apparatus, additives, temperature, etc.). The average particle size may be between 0.05–100 $\mu$m. The process according to the invention is highly suitable for obtaining a powder coating dispersion comprising very small, spherical-like particles with a narrow particle size distribution. The average size of the particles is preferably from 50 to 2,000, more preferably from 80 to 800, most preferably from 100 to 500 nm. Particles in the range below 800 nm have the advantage that they do not have the tendency to sediment which ensures a very good stability of the final dispersion. In general, sedimentation can be prevented by adjusting the rheology of the dispersion by addition of for example thickeners or other rheology modifiers. However, this has a negative effect on the final solids content of the dispersion (which will decrease by adding these constituents) and can have a negative effect on the properties of a film prepared from such dispersion. The particles in the aqueous powder coating dispersion prepared according the present invention can be so small (smaller than 800 nm) that no additional measures are needed to control sedimentation which obviates the necessity to add rheology modifiers and results in coating formulations with higher solids content and better coating performance.

In general, the apparatus used in the process according to the invention comprises a feeding port, an exit port, and options to add additional liquids, solids or dispersed components between the feeding port and the exit port. Also a high flexibility is desired to control the different steps in the process (melting, cooling down, and dispersing).

The aqueous medium, e.g., tap water or demineralised water, used in the process according to the invention optionally comprises a dispersing agent in order to facilitate the formation of a homogeneous dispersion. Furthermore, said dispersing agent may contribute to the formation of particles with a uniform size and shape. The aqueous medium may also comprise thickeners and/or other additives.

Any suitable dispersing agent can be used in the process according to the invention, for example anionic, cationic, amphoteric, nonionic compounds or combinations thereof as described in C. R. Martens, *Emulsion and Water-Soluble Paints and Coatings*, Reinhold Publishing Corporation, 1965. The dispersing agent may also comprise functional groups capable of reacting with the resin and/or the crosslinker in order to form a crosslinked network comprising said agent. The dispersing agent should be selected carefully, because some types of dispersing agents may inhibit crosslinking reactions. Furthermore, the presence of relatively high amounts of non-reactive dispersing agents in a crosslinked film generally has a negative impact on the final properties of the film. Therefore, it is preferred:

1. to use dispersing agents with reactive groups (e.g., acid-functional group), and/or
2. to use limited amounts of dispersing agents with high dispersing/stabilising properties, and/or
3. to use neutralising agents which can form ionic groups with functional groups (e.g., carboxylic groups) present in the resin and/or crosslinker.

Typical examples of these neutralising agents are amines, ammonia and alkylmetalhydroxides. Preferably volatile neutralising agents with a boiling point below the curing temperature of the solid powder coating composition are used. Organic amines, preferably tertiary amines, are highly suitable volatile neutralising agents, but there is no intention to limit the invention to these compounds only.

It was found that the use of dispersing agents with reactive groups or the use of neutralising agents which can form anions with functional groups present on the binder and/or crosslinker enable the preparation of dispersions with an average particle size in the range from 50 to 800 nm and a solid content in the range of 30 to 70 wt. %, more particular in the range from 40 to 60 wt. %.

Examples of dispersing agents with reactive groups include dispersing agents with carboxylic acid, sulphonic acid and/or phosphonic acid functional groups.

Any suitable resin/crosslinker combination for coating a substrate with a crosslinked film can be used as starting material in the process according to the invention. For the purpose of the present application a resin means any resin that can be cured on a substrate. The resin used as starting material in the process according to the invention may be a thermally curable resin, i.e. a resin that can be cured by elevated temperature, or a radiation-curable resin, i.e. a resin that can be cured by using electromagnetic radiation with a wavelength of less than 500 nm, e.g., UV or electron beam radiation. A thermally curable resin is usually combined with a crosslinker in order to enable the formation of a crosslinked network.

The binder resin and/or crosslinker used as a starting material in the process according to the invention can be amorphous and/or (semi)-crystalline. Also combinations of an amorphous resin and a crystalline crosslinker are possible.

Furthermore, the binder resin and/or crosslinker may comprise functional groups that facilitate the dispersing in the process according to the invention in the aqueous medium. Such functional groups may be regarded as self-emulsifyable groups. It was found that the use of resins and/or cross-linkers with such self-emulsifyable groups are in particular favourable to obtain dispersions with particles having a small average particle size, i.e. an average particle size in the range from 50 to 800 nm. Examples of functional groups that can facilitate the dispersing of the molten-like substance in the process according to the present invention are carboxylic acid, sulphonic acid, and/or phosphonic acid functional groups.

The aqueous powder coating dispersion may comprise any suitable thermally curable resin/crosslinker combination. Suitable combinations are described for example in T. A. Misev, *Powder Coatings Chemistry and Technology*, John Wiley & Sons Ltd 1991, like an acid/epoxy, acid anhydride/epoxy, epoxy/amino resin, polyphenol/epoxy, phenol formaldehyde/epoxy, epoxy/amine, epoxy/amide, isocyanate/hydroxy, carboxy/hydroxyalkylamide, or hydroxyl/epoxy combination. The process according to the present invention is in particular suited for resin/crosslinker combinations which intend to react at the processing temperature or even at lower temperatures. Those reactive binder/crosslinker combinations are difficult to handle in the current powder coatings production process.

Examples of highly suitable thermally curable resin/crosslinker combinations are: acid/epoxy, isocyanate/hydroxy, carboxy/hydroxyalkylamide, and acid/oxazoline.

An example of an aqueous powder coating dispersion comprising an acid/epoxy combination is a dispersion, in which a carboxy-functional polyester resin is present as a thermally curable resin and for example a Bisphenol-A epoxy resin is present as a crosslinker. Examples of commercial carboxy-functional polyesters are: Uralac P3560 (ex. DSM Resins) and Crylcoat 314 (ex. UCB Chemicals). Examples of Bisphenol-A epoxy resins are Epikote 1055 (ex. Shell) and Araldite GT 7004 (ex. Ciba Chemicals).

An aqueous powder coating dispersion comprising a carboxy/hydroxyalkylamide combination is most commonly obtained from a carboxy-functional polyester resin and a hydroxyalkylamide such as Primid XL-552 (EMS). An example of a commercial carboxy-functional polyester resin is Crylcoat 76-17 (ex. UCB Chemicals).

An aqueous powder coating dispersion comprising an isocyanate/hydroxy combination is based on a hydroxy functional binder and a polyfunctional isocyanate. The hydroxy functional binders can, for example, be either polyester or polyacrylic based. The polyfunctional isocyanate can be blocked or unblocked. By mixing a composition comprising component A (e.g. hydroxy functional polyester)

and component B (e.g. polyisocyanate) just prior to application non-blocked isocyanates can be used without having the problems of extensive pre-reaction of resin and crosslinker. Examples of commercial hydroxy-functional polyesters are: Uralac P5504 (ex. DSM Resins) and Alftalat AN 739 (ex. Vianova Resins). Examples of commercial isocyanates are Vestagon B1530, Vestanat T1890 (both ex. Creanova) and Bayhydur 3100 (ex. Bayer).

An aqueous dispersion based on acid/oxazoline chemistry is based on an acid group containing compound and a compound containing oxazoline functional groups. The acid group containing compound can be a polycarboxylic acid like Sebacic acid or Dodecanedionic acid but can also be a polymer containing acid functional groups. This polymer can for example be a polyester, polyacrylate or polyurethane. The oxazoline group containing compound can be a polyoxazoline like 1,4-phenylene-bis(2-oxazoline) but also a polymer containing oxazoline functional groups. This polymer can for example be a polyester or polyacrylate. Examples of commercially available oxazoline functional polymers include Epocros K-1000, K-2000, WS-500 (all ex. Nippon Shokubai).

It is also possible to use a binder/crosslinker combination that can be cured by radiation, more in particular by electromagnetic radiation having a wavelength of less than 500 nm, e.g. UV or electron beam radiation.

Examples of suitable radiation-curable powder coating compositions are described in EP 636 669 and EP 702 040. In EP 636 669 radiation-curable resin compositions are disclosed which comprise an unsaturated polyester and/or an unsaturated polyacrylate, and a cross-linking agent having vinyl ether, vinyl ester or (meth)acrylate-functional groups. In EP 702040 radiation-curable unsaturated polyester/urethane acrylates binder/crosslinker mixtures are disclosed.

The aqueous powder coating dispersion that is obtained in the process according to the present invention may also comprise a pigment or a mixture of pigments, a catalyst or a mixture of catalysts, an initiator or a mixture of initiators, a tickener and/or a mixture of thickeners, a filler or a mixture of fillers, and/or an additive or a mixture of additives. These additional components can be present in the composition comprising component A and/or B. One or more of these additional components may also be dosed individually during the process. Furthermore, it is possible to add one or more of these additional components to the final powder coating dispersion.

By an additive is meant, any suitable additive that is usually present in a commonly applied coating composition for coating a substrate with a crosslinked film. Such an additive is selected for example from an auxiliary agent, a flowing agent, a stabiliser, a anti-settling agent, a surface-active agent, a de-gassing agent, a UV-absorber, an optical whitener, a radical scavenger, and an anti-oxidant. Furthermore, any filler known to those skilled in the art can be present, e.g., barium sulphate, calcium sulphate, calcium carbonate, silicas or silicates (such as talc, feldspar, and/or china clay).

The process according to the invention is highly suitable for preparing an aqueous powder coating dispersion comprising a pigment. The pigment can be dosed individually during or after the process, or it can be introduced via the composition comprising component A. It is preferred that the pigment is added before the final dispersion is prepared, thereby enabling the formation of an aqueous powder coating dispersion with small and spherical-like particles having a uniform size, wherein the pigment is homogeneously distributed. When said dispersion is used for coating a substrate, then a crosslinked film of uniform thickness and appearance is formed on the substrate.

A powder coating dispersion obtained in the process according to the invention may be applied directly for coating a substrate with a crosslinked film. It is also possible to add one or more of the above-described additional components to the dispersion in order to obtain a powder coating composition that can also be applied directly onto a substrate. Normally, the dispersion is filtered before or after the addition of the additional components.

Furthermore, the powder coating dispersion or coating composition may be dried, e.g., by spray-drying, in order to obtain a solid powder coating composition comprising small, spherical-like particles.

The invention will be further illustrated with reference to the following non-limiting examples, wherein the following apparatus settings for preparing aqueous powder coating dispersions were applied:

Apparatus: Leistritz twin-screw micro-18-GL 40 D extruder, comprising the following zones, including type of screw element and temperature applied in each zone:

| 0 | Transport | RT | (feeding a composition comprising component A) |
|---|---|---|---|
| 1 | melting/kneading | 130° C. | |
| 2 | melting/kneading | 130° C. | |
| 3 | Transport | 90° C. | |
| 4 | Transport | 90° C. | (dosing a dispersing agent and water, optionally component B) |
| 5 | Kneading | 90° C. | |
| 6 | Kneading | 90° C. | |
| 7 | Transport | 90° C. | (dosing water) |
| 8 | Mixing | 80° C. | |

RT = room temperature.
The screw speed of the apparatus was set at 250 rpm.

The average size of the particles in the dispersion was measured using a Coulter LS230 particle sizer. The shape of the particles was evaluated by Scanning Electron Microscopy (SEM).

In the examples the following starting materials are used:

| | |
|---|---|
| Uralac P3560 | a carboxy-functional polyester ex. DSM |
| Kronos 2310 | a TiO$_2$-bases pigment ex. Kronos |
| Resiflow PV88 | a flowing agent ex. Worlee |
| Benzoine | a de-gassing agent ex. DSM |
| Araldite GT7004 | a Bisphenol-A type epoxy resin ex. Ciba Chemicals |
| Crylcoat V76-17 | a carboxy-functional polyester ex. UCB Chemicals |
| Primid XL-552 | a hydroxyalkylamide ex. EMS |
| Trigonox 21S | a radical initiator ex. Akzo Nobel |
| Epocros K-2020E | a poly-oxazoline functional polymer ex. Nippon Shokubai |

EXAMPLE 1

Preparation of Hybrid Based Powder Coating Dispersion

A binder pre-mix was obtained by mixing 700 pbw of Uralac P3560, 300 pbw of Kronos 2310, 15 pbw of Resiflow PV88 and 7.5 pbw of Benzoine. The pre-mix was added to zone 0 of an extruder with the above described configuration at a rate of 500 gr/h. In zone 4 a 15 wt. % solution of Sodium dioctylsulphosuccinate in water was added at a rate of 125 gr/h. In zone 7 water was added at a rate of 415 gr/h to obtain a white milky aqueous dispersion comprising component the acid functional polyesterresin (component A). In a separate step a dispersion of epoxy resin was made by feeding Araldite GT7004 to zone 0 of the extruder at a rate of 500 gr/h. In zone 4 a 20 wt. % solution of Sodium dioctylsulphosuccinate in water was added at a rate of 125 gr/h. In zone 7 water was added at a rate of 400 gr/h to obtain a white milky aqueous dispersion comprising the epoxy resin (component B). The aqueous powder coating dispersion containing both polyesterresin and epoxyresin was obtained by mixing 500 pbw. of dispersion comprising component A and 150 pbw. of dispersion comprising component B. The final white milky dispersion had a solids content of around 50 wt. %, and an average particle size of 250 nm. The dispersion was applied on a steel panel at a film thickness of 35 μm dry, pre-dried at 80° C. for 10 minutes followed by curing at 180° C. for 15 minutes. A high gloss coating was obtained with Gardner impact resistance of 160 IP.

EXAMPLE 2

Preparation of Hydroxyalkylamide Based Powder Coating Dispersion

A binder pre-mix was obtained by mixing 980 pbw of Crylcoat V76-17, 12.4 pbw of Resiflow PV88 and 7.6 pbw of Benzoine. The pre-mix was added to zone 0 of an extruder with the above described configuration at a rate of 473 gr/h. In zone 4 a 12.5 wt. % solution of dimethylethanolamine in water was added at a rate of 96 gr/h and a 50 wt. % Primid XL-552/water mixture was added at 49 gr/h. In zone 7 water was added at a rate of 382 gr/h to obtain a white milky aqueous powder coating dispersion having a solids content of 50 wt. %, a pH of 7.1 and the average size of the spherical-like particles was 190 nm.

EXAMPLE 3

Preparation of Hydroxyalkylamide Based Powder Coating Dispersion

The pre-mix of Example 2 was added to zone 0 of an extruder with the above described configuration at a rate of 473 gr/h. In zone 4 a 12.5 wt. % solution of dimethylethanolamine in water was added at a rate of 96 gr/h. In zone 7 water was added at a rate of 382 gr/h to obtain a white milky aqueous binder resin dispersion. In a separate step a 50 wt. % solution of Primid XL-552 in water was stirred in and a white milky aqueous powder coating dispersion having a solids content of 50 wt. %, a pH of 7.0 and an average particle size of 200 nm was obtained.

EXAMPLE 4

Preparation of a Polyacrylic Resin

A 10 ltr. reaction vessel equipped with stirrer, reflux condensor, a nitrogen inlet device and thermometer was charged with 1514 gr. of propylene glycol methylether and heated to reflux temperature under a nitrogen flow of 3 l/hr.

A monomer/initiator mixture consisting of 483 gr. of acrylic acid, 537 gr. of butylmethacrylate, 2640 gr. of methylmethacrylate, 1710 gr. of n-butylacrylate and 268 gr. of Trigonox 21 S (ex. Akzo Nobel) was prepared and continuously added within a period of 4 hours. After dosing the monomer/initiator mixture an additional amount of 265 g. of propylene glycol methylether was added. A post addition of 14 g. of Trigonox 21 S and 70 g. of propylene glycol methylether was added 30 minutes after adding the monomer/initiator mixture. The total mixture was kept for an additional hour on reflux. After the polymerisation was completed, measured by a monomer conversion above 98% (1 hr. at 125° C.), the solvent propylene glycol methylether was distilled off under reduced pressure at a temperature up to 170° C. The final solid resin had Tg of 32° C. measured with DSC and a solids content of 99.9%.

EXAMPLE 5

Preparation of Acid/Oxazoline Based Dispersion 500 gr. of the acid functional polyacrylic resin prepared in EXAMPLE 4 was added to zone 0 of an extruder with the above described configuration at a rate of 500 gr/h. In zone 4 a 25 wt. % solution of dimethylethanolamine in water was added at a rate of 45.6 gr/h and water was addded at a rate of 99.2 gr/h.

In zone 7 water was added at a rate of 435 gr/h to obtain a white milky aqueous dispersion having a solids content of 46.3 wt. %. The average size of the spherical-like particles was 178 nm. For the preparation of the acid/oxazoline based dispersion 54 pbw. of the polyacrylic resin dispersion and 46 pbw. of Epocros K2020E were mixed and applied on a steel panel at a film thickness of 50 μm dry, pre-dried at 80° C. for 10 minutes followed by curing at 150° C. for 20 minutes. A high gloss clearcoat was obtained with a pendulum hardness of 186 sec. and a solvent resistance of 200 double MEK-rubs.

In table 1 an overview is presented of the properties of the powder coating dispersions of Examples 2 and 3 after application on steel panels and curing at 180° C. for 15 minutes. As comparison a solid powder coating composition was applied based on the same chemical composition as present in the aqueous powder dispersions described in example 2 and 3.

The properties of the cross-linked films formed on the steel panels were measured after storage at room temperature for at least 24 hours.

The film thickness was measured in accordance with ASTM D 1186.

The Gloss 20° was measured in accordance with ASTM D523.

The Impact resistance (Direct/Reverse) was measured in accordance with ASTM D2794.

The Cross-cut test was carried out in accordance with ISO 2409.

The Scratch resistance determination with was carried out in accordance with ASTM D1474.

The MEK solvent resistance was carried out according ISO 2812

TABLE 1

| Properties | Solid powder coating composition | Example 2 | Example 3 |
| --- | --- | --- | --- |
| Film thickness (μm) | 50 | 23–25 | 24–25 |
| Gloss 20° | 80 | 85 | 76 |
| Impact resistance | >160 | >160 | >160 |
| Cross-cut | 1 | 0 | 0 |
| Scratch resistance | H-2H | HB-F | HB-F |

It was concluded that the films obtained from the powder coatings dispersions are thinner than the film obtained from the solid powder coating composition, and that the properties of the films that have been obtained from the same basic raw materials are on the same level.

What is claimed is:

1. A process for preparing an aqueous powder coating dispersion comprising components A and B, wherein component A is a binder resin or a mixture of binder resins and component B is a crosslinker or a mixture of crosslinkers or component A is a crosslinker or a mixture of crosslinkers and component B is a binder resin or a mixture of binder resins, wherein the process comprises the steps of:
   a) dispersing a composition comprising component A by the addition of an aqueous medium in a phase inversion emulsification process,
   b) the addition of component B simultaneously with or after the adding of the aqueous medium, and
   c) optionally mixing the obtained composition to obtain a dispersion comprising components A and B.

2. Process according to claim 1 wherein component B is dispersed in an aqueous medium before it is added to the substance comprising component A.

3. Process according to claim 1 wherein component B is dispersed in an aqueous medium after it is added to the substance comprising component A.

4. Process according to claim 1 wherein component B is added as an aqueous solution to the substance comprising component A.

5. Process according to claim 1, where component B is added to the substance comprising component A just prior to application of the aqueous powder dispersion on a substrate.

6. Process according to claim 5 wherein the powder coating dispersion comprises a binder/crosslinker mixture that is curable at ambient temperature.

7. Process according to claim 1 wherein component B is added simultaneously with the aqueous medium.

8. Process according to claim 1 wherein the obtained aqueous powder coating dispersion comprises a pigment.

9. Process according to claim 1 wherein the aqueous medium comprises a dispersing agent.

10. Process according to claim 9 wherein the dispersing agent is a neutralising agent which can form anions with the functional groups present in the resin and/or crosslinker.

11. Process according to claim 10 wherein the boiling point of the neutralising agent is below the curing temperature of the solid powder coating composition.

12. Process according to claim 10 wherein the neutralising agent is a tertiary amine or ammonia.

13. Process according to claim 1 wherein all steps in the process are carried out in an extruder.

14. Process for preparing a powder coating composition wherein one or more additional components selected from suitable pigments, thickeners, catalyst, initiators, additives, and fillers, are added to an aqueous powder coating dispersion that is obtained according to claim 1 and that the dispersion is filtered before or after the addition of said additional components.

15. Process for preparing a solid powder coating composition wherein the solid powder coating composition is prepared by drying the aqueous powder coating dispersion obtained by the process according to claim 1.

16. Aqueous powder coating dispersion comprising a homogeneous mixture of a resin, a cross-linker, and, optionally, a pigment, a thickener, a catalyst, an initiator, and/or one or more additives wherein the resin and/or the cross-linker comprises carboxylic acid, sulphonic acid, and/or phosphonic acid functional groups and wherein the average particle size of the particles present in the dispersion is in the range from 50 to 80 nm.

17. Process according to claim 11 wherein the neutralising agent is a tertiary amine or ammonia.

* * * * *